May 7, 1940. J. C. SANDERS 2,199,971
AIRCRAFT GUN MOUNT AND SWINGABLE ENCLOSURE THEREFOR
Original Filed Oct. 17, 1934 3 Sheets-Sheet 1
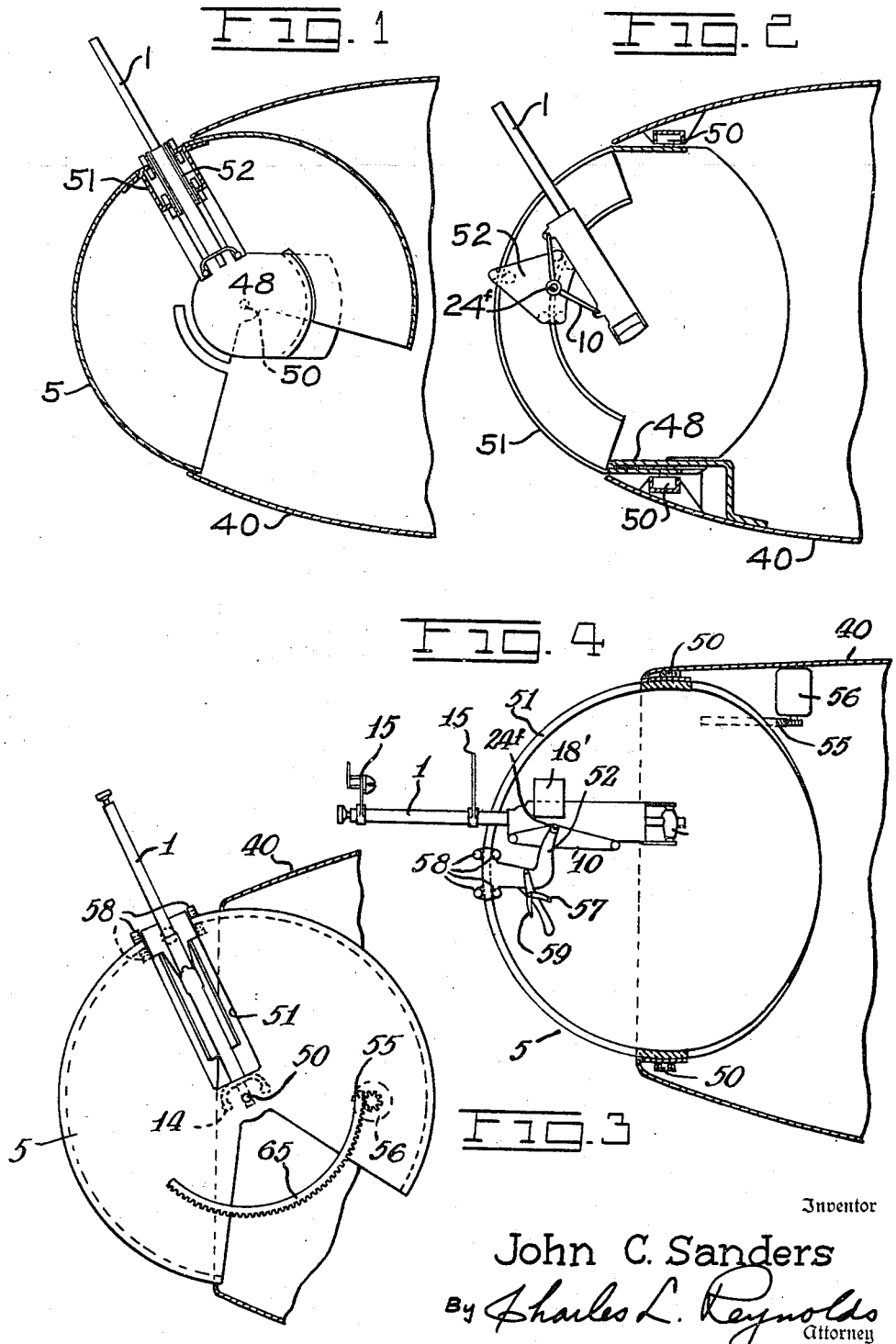
Inventor
John C. Sanders
By Charles L. Reynolds
Attorney May 7, 1940.  J. C. SANDERS  2,199,971
AIRCRAFT GUN MOUNT AND SWINGABLE ENCLOSURE THEREFOR
Original Filed Oct. 17, 1934    3 Sheets-Sheet 2
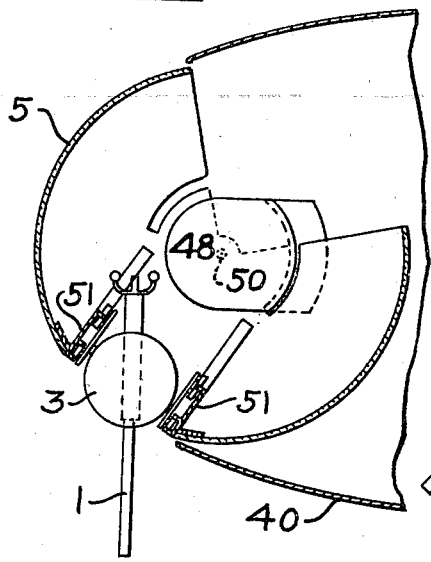
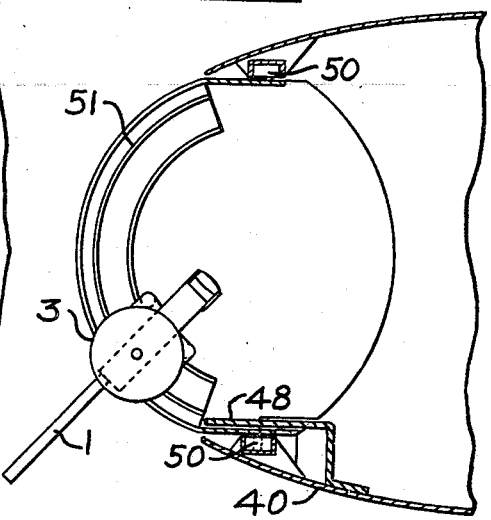
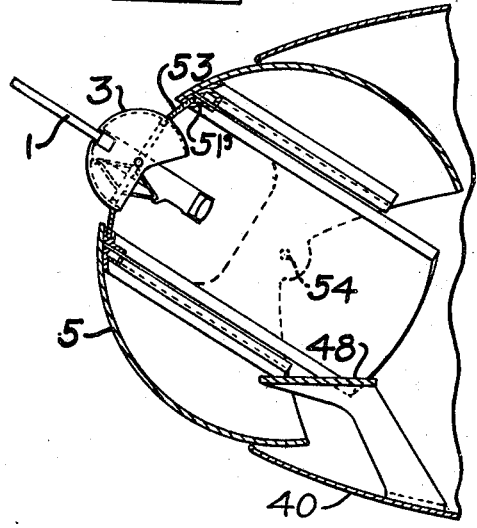
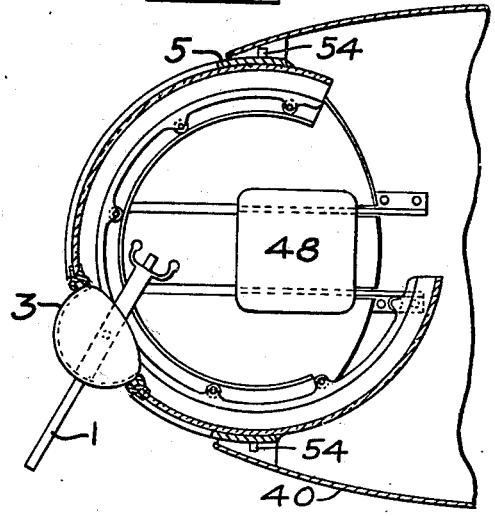
Inventor
John C. Sanders
By Charles L. Reynolds
Attorney May 7, 1940.   J. C. SANDERS   2,199,971
AIRCRAFT GUN MOUNT AND SWINGABLE ENCLOSURE THEREFOR
Original Filed Oct. 17, 1934   3 Sheets-Sheet 3
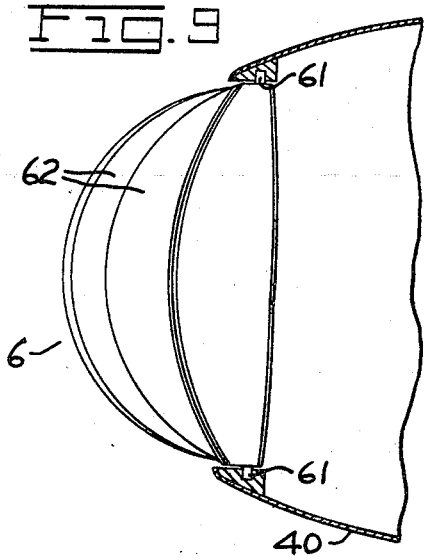
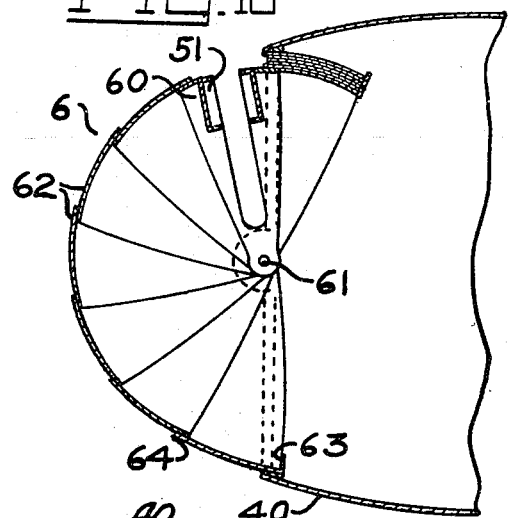
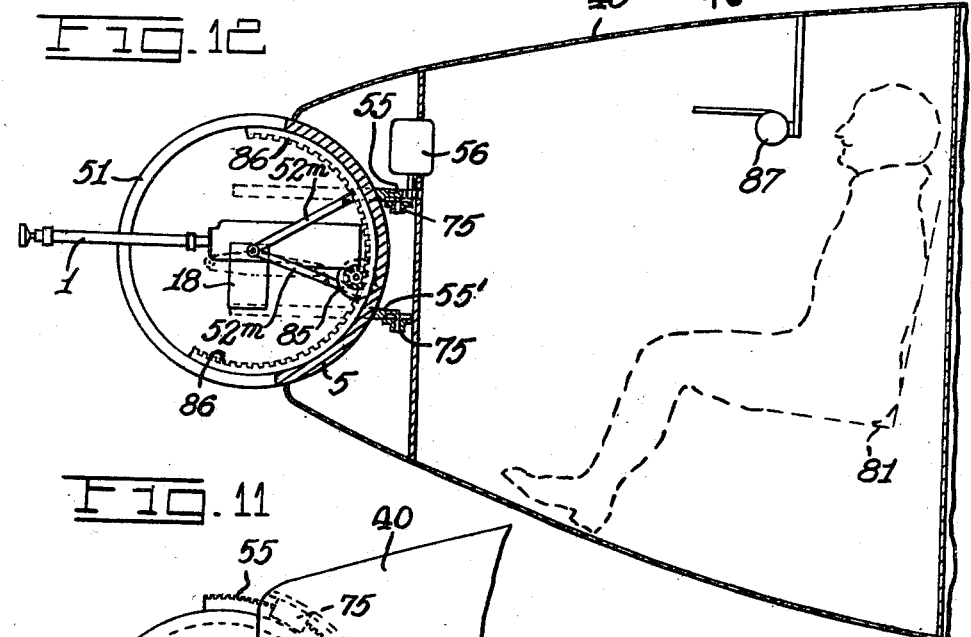
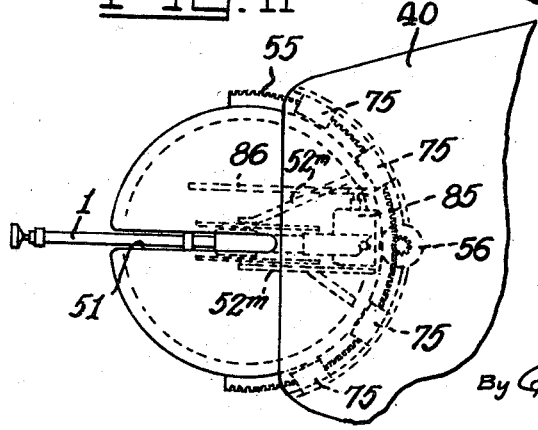
Inventor
John C. Sanders
By Charles L. Reynolds
Attorney Patented May 7, 1940

2,199,971

UNITED STATES PATENT OFFICE 2,199,971

AIRCRAFT GUN MOUNT AND SWINGABLE ENCLOSURE THEREFOR

John C. Sanders, Seattle, Wash., assignor, by mesne assignments, to The Pacific National Bank of Seattle, Seattle, Wash., a national banking association Original application October 17, 1934, Serial No. 749,040. Divided and this application December 21, 1936, Serial No. 116,919

29 Claims. (Cl. 89—37.5)

My invention relates to gun mounts for aircraft, and in particular to gun mounts for machine guns to be installed in airplanes.

This application is a division of my application Serial No. 749,040, filed October 17, 1934, now Patent No. 2,113,143 issued April 5, 1938.

My novel gun emplacement is peculiarly suited to installations in the end of an airplane fuselage. It may thus be employed to advantage in an airplane of the bombardment type, which is capable of very high speed, and which for that reason must have its armament enclosed so that no more air resistance than necessary will be created, and so that the gunner may maneuver the gun without the hindrance caused by his being exposed or the gun being unnecessarily exposed to the relative air moving at high speed past the airplane.

It is therefore an object of my invention to provide a gun mount and an enclosure therefor which may be mounted at the end of an airplane fuselage, and which may be manipulated easily and speedily by the gunner to train the gun in different directions through an extremely wide field of fire.

Especially is it my purpose to provide such a mount which will enable a gunner to train the gun quickly from one side of the fuselage to the other by supporting the gun mount on a pivot disposed transversely of the airplane fuselage.

It is a further object to provide a power drive for training the gun either to assist and facilitate direct control of the gun by the gunner, or to enable the gunner to control the gun indirectly from a location remote from the gun mount.

The particular manner in which these and other objects are obtained will be made clear in the description of the specification, and from an inspection of the drawings.

My invention comprises the novel type of gun mount and its installation in an aircraft structure, as shown in the drawings and described hereafter, the novel features of which are particularly pointed out in the claims.

The drawings show several illustrative embodiments of my invention, largely in diagrammatic form to portray the principles and unique features of my construction.

Figure 1 is a longitudinal horizontal section, and Figure 2 is a vertical longitudinal section of one form of my invention.

Figures 3 and 4 show a slightly different form corresponding to Figures 1 and 2, respectively, and incorporating power driving mechanism.

Figures 5 and 6 show a further modification:

Figure 5 corresponds to Figure 1 and Figure 6 to Figure 2.

Figures 7 and 9 likewise correspond to Figure 2 except that in Figure 9 the shell is shown in elevation instead of section, and Figures 8 and 10 correspond to Figure 1, these figures, 7 and 8 together and Figures 9 and 10 together, illustrating other modifications.

Figure 11 is a plan view, and Figure 12 a vertical longitudinal section, showing still a further form of my invention, involving power operated movement of both the gun and its enclosure, which movements are controlled by a gunner located at a distance from the gun installation.

My gun is adapted for installation in an opening formed in the end of an aircraft body, although it might be disposed in an aperture formed in the side thereof. Primarily the gun enclosure is supported from the aircraft structure to swing about an axis disposed transversely of the aircraft structure opening whether that axis be vertically disposed, as in Figures 1 to 6 and 9 to 12, or horizontally as in Figures 7 and 8, while the immediate gun mount is supported from the enclosure to swing about an axis in a plane normal to that about which the enclosure swings.

In all the figures the airplane fuselage 40 is shown terminating in a substantially planar circular opening extending transversely of the longitudinal axis of the fuselage or of the direction of flight. This opening in each case is closed by a shell 5 in the form of a body of revolution, which is specifically shown to be spherical. This enclosure is mounted for oscillation with respect to the aircraft structure upon the transverse axis previously referred to.

In Figures 1 to 6 inclusive the shell is supported and guided for oscillation by the vertically disposed bearings 50. In Figures 7 and 8 similar bearings disposed horizontally are indicated at 54. In Figures 9 and 10 the bearings 61, which carry the spherical lunar sections making up the shell, correspond to the bearings 50 in Figures 1 to 6. The construction shown in Figures 11 and 12 preferably does not employ pivot pins, and the nature of this mechanism will be described hereafter, although if desired, bearings similar to those shown in the other figures may be employed.

The shell in each case is provided with a great circle slot disposed coplanar with the pivot axis of the shell. In Figures 1 to 4 and 9 to 12 inclusive this slot is of a width just sufficient for projection of the gun therethrough, and in Figures 1 to 6 and 9 to 12 the slot is disposed vertically. In the forms illustrated in Figures 1 to 10 inclusive tracks 51, designated 51g in Figures 7 and 8, are provided, within which a carriage 52 supporting a gun mount 10 is movable, the gun mount being tiltably supported upon the carriage, as will be explained hereafter.

In the directly controlled forms of Figures 1 to 10 inclusive the gunner stands upon a platform 48, supported from the aircraft structure and projecting into the shell 5. In Figures 1 to 6, 9 and 10 this platform overlies the vertical pivot of the shell, although illustration of this platform has been omitted in Figures 9 and 10 to show clearly the details of the pivots supporting the shell sections. In the form of Figures 7 and 8 the gunner's platform projects up over the lower edge of the shell swingable upon a horizontal axis. Thus the gunner is supported within the shell, so that by movement of the gun he may rock the shell about its pivot axis, or he may move the gun support carriage in an arc upon the tracks 51, or both, and in this manner universal movement of the gun may be accomplished.

In addition it is desirable to have the gun movable with respect to its immediate support. Thus in the mount employed in Figures 1 to 4, 9 and 10 the gun may be pivoted upon an axis 24' extending transversely of the slot for swinging of the gun along the slot without movement of the carriage, although such swinging of the gun must necessarily afford a lesser range of traverse than when the carriage itself is moved in conjunction with the local swinging of the gun. In the form of Figures 5 to 8 inclusive the carriage 52, or the equivalent band 53 of Figures 7 and 8, carries a gun shield in the form of a sphere 3, surrounding the mount of the gun 1. Within this sphere may be received a gun mount enabling both local traversing and elevational movement of the gun as well as rotational movement of the gun about its longitudinal axis, if this should be desired. Such a support is of the same type as that shown in the sphere arrangement of Figures 1 to 5 inclusive in my Patent No. 2,113,143, referred to previously. Thus universal movement of the gun, both locally and in conjunction with the shell 5, may be accomplished, to cover at least a hemispherical field of fire forwardly of the airplane fuselage, or rearwardly, if the mount is at the tail of the airplane.

In the arrangement of Figures 7 and 8 a band 53 is provided to close the relatively wide slot, and a similar band may be employed in the form shown in Figures 5 and 6. This band may be moved as a whole along the slot 51 instead of providing a small carriage, as shown in Figures 5 and 6, for such movement. With this construction the slot will be covered in all positions of traverse of the sphere 3, for the band is substantially twice the length of the slot 51g.

In Figures 9 and 10, as has been stated, the gunner's platform 8 has been omitted in the drawings for clearer illustration, but such platform and a gun mount carriage to ride in the tracks 51, similar to those shown in Figures 1 and 2, for example, would be provided. The enclosure 6 in Figures 9 and 10 differs from the shell 5 of Figures 1 to 8 inclusive in that it is formed of a plurality of sections, each section being in the shape of a spherical lune. These sections are movable relatively to each other, but means are provided to prevent their disconnection, so that they will always overlap but may move from nested relationship into edge to edge disposition. These segments 62 are pivoted upon a common vertical axis, as indicated at 61, and the gun mount moves on tracks 51 along the margin of a great circle slot, extending substantially from end to end of a central section or segment 60.

As shown in Figure 10, the sections at one side of the section 60 are capable of nesting together adjacent to one side of the opening in the airplane fuselage 40. The segments on the other side of the section 60 are at the same time extended in edge to edge relationship to close the fuselage opening. As the segment 60 is swung to the port side of the airplane, each segment on the port side will in turn contact with a fixed stop 63 upon the terminal segment, and this segment in turn has a stop 64 which will contact with the end of the fuselage, and the successive segments will nest together. At the starboard side of the airplane at the same time, each successive segment is drawn from its nested position by contact with the next outer segment, and it will in turn draw forth the following segment. Thus the contour of the enclosure 6 will at all times be complete, yet the segments will not project sufficiently within the fuselage to be in the way of the gunner or of other installations.

In Figures 3, 4, 11 and 12 power mechanism is provided to drive the gun enclosure or shell 5, to overcome the large resistance to movement caused by air pressure on the projecting muzzle of the gun. In Figures 3 and 4 the gun mount carriage is manually movable along the slot 51, as it is in Figures 1 and 2. However, the shell 5 is controlled for one type of movement, as traversing movement, by power means such as the motor 56 fixed within the fuselage and engaging an arcuate rack 55 secured to the enclosure 5 by means of a motor-driven gear. The motor, which should be of a reversing type, is controlled from a position adjacent to the gun, for instance by a motor control arm 57. The carriage 52, movable in the guide 51, is supported therein by pairs of separable wheels or shoes 58, controllable by a second arm 59, so that they form in effect a clutch to hold the gun and its support in any position along the tracks 51 which define the gun slot. An ammunition container 18' is shown in this view mounted above the gun.

Figures 11 and 12 show power means controlled from a distant point for driving the gun for both elevational and traversing movements. The traversing of the shell 5 is accomplished by a motor 56 and gear arrangement 55 in the same manner as the motor drive of Figures 3 and 4. The gun support 52m, whereon the gun may swing for elevational movement, has secured to it a second motor 85, and a pinion which meshes with the rack 86 mounted on the interior of the inner side of the shell, in a plane parallel to the plane of the slot 51. The trunnion support, which carries the gun, the motor 85, and its pinion, is supported within and from the spherical enclosure 5 to pivot about a diameter thereof. Accordingly the elevational movement of the gun along the slot 51 may be accomplished by energizing the motor 85, and traversing movement of the enclosure and gun is effected by energization of the motor 56.

The spherical enclosure 5 may be supported on trunnions, as are the shells shown in the other forms of my device. However, I prefer that the rack 55 be guided in fixed arcuate guides 75, with a companion segment 55' similarly guided and supported.

The gunner is located remote from the gun mount in the aircraft structure. He may sit in his chair 81 and control the motors 56 and 85 and the firing of the guns by appropriate devices which are not shown, but which controls would be adjacent to the gunner's support 81. The gun also may be sighted by, and its position controlled by power means, in accordance with, any convenient remote sighting arrangement (the character of which is immaterial to the present invention), one member of which is illustrated at 87 adjacent to the gunner's eyes.

By employing power means to effect general movement of the gun, in one or in both angular movements, the gunner is relieved of the considerable physical effort required to move the gun in opposition to the air pressure upon its projecting muzzle, which at high speeds, with even a small amount of projection, may exceed one hundred pounds. It is intended to employ power means in whatever form of mount it seems desirable, and for one or both directions of angular movement, and if the gun is also locally movable, in each adjusted position, as in Figures 5 to 8, the gunner is enabled by suitable power means to bring the gun, with a minimum of effort and with the greatest speed and control, into position to bear on his target, and then by the local manual adjustments he may follow the immediate movements of the target, and may train the gun on the target.

Likewise it will be realized that the relative wind, at high speeds, may not be permitted to sweep through the gunner's position, entering through an open slot, for this would be much the same as though the gunner were out in the open. This may be avoided in the manner shown in Figures 7 and 8, for instance, by closing the slot with a closure 53 to prevent entrance of the draft, or by the obviously equivalent way of closing the rear of the space which is open to the front, to prevent exit of the draft, permitting building up of pressure within the space, but not flow therethrough. Such an arrangement is suggested in Figures 11 and 12, wherein the shell 5 is closed to the rear of the open slot 51, and the fuselage is closed by a partition to the rear of the shell. This prevents air flowing from the pressure space within or around the shell 5 into the general body of the fuselage 40. While this closure is ahead of the gunner, it might be to the rear of the gunner, and between the gunner and the remainder of the fuselage, as is also shown in Figure 12, in which case, if the forward closure were omitted, the gunner would merely be subjected to the built-up pressure in a compartment open to the front by a gun slot or aperture, but closed behind him so as to prevent air flow past him.

What I claim as my invention is:

1. In a truncated but otherwise streamlined aircraft structure terminating in an opening extending transversely of the direction of flight, pivot means extending generally parallel to the plane of the edge of such opening and mounted on the aircraft structure at opposite sides thereof, an enclosure, including a plurality of sections, each in the form of a spherical lune, disposed in telescoping relationship and supported by and swingable about said pivot means, closing such opening in streamline longitudinal continuation of the aircraft structure, and mounting means upon said enclosure to support a gun for projection from said enclosure.

2. In an aircraft structure having an opening therein, pivot means extending generally parallel to the plane of the edge of such opening and mounted on the aircraft structure at opposite sides thereof, an enclosure closing such opening, including a plurality of nesting sections, each in the form of a spherical lune, twice the number required to close the opening, disposed in laterally telescoping relationship and supported by and swingable about said pivot means, one of said sections, near the center of the nest, being apertured for projection of a gun therethrough, and mounting means upon said apertured section to support a gun projecting through such aperture.

3. The combination of claim 2, wherein the aperture is formed as a slot extending substantially from end to end of the spherical lune section, and the mounting means is adapted to support the gun for movement along such slot.

4. The combination of claim 2, wherein the aperture is formed as a slot extending lengthwise of the spherical lune section, and the mounting means includes tracks extending along the margins of the slot to guide the gun for movement therealong.

5. In an aircraft structure having an opening therein, pivot means extending generally parallel to the plane of the edge of such opening and mounted on the aircraft structure at opposite sides thereof, an enclosure closing such opening comprising a plurality of nesting sections of an aggregate extended extent substantially twice that required to close such opening, disposed in laterally telescoping relationship and supported by and swingable about said pivot means, and including a central section having a slot extending lengthwise thereof for projection of a gun therethrough, means at each side of said aircraft structure opening to receive in stored nested relationship the sections at its side of said central section while the remaining sections are extended in edge to edge relationship across such opening to close the same, and mounting means to support a gun projecting through the central section slot for swinging of the gun with such section, and for movement lengthwise of such slot.

6. In an aircraft structure terminating in an opening, the edges of said opening determining a plane vertically disposed to the longitudinal axis of said structure, a shell closing such opening, pivot means disposed substantially parallel to the plane of the edge of the opening and guiding said shell for swinging about a vertical axis with respect to the aircraft structure, a gun mount received in said shell to support a gun projecting therefrom, a gunner's platform supported independently from the aircraft structure and projecting into said shell to overlie the pivot means at the lower side of the shell, and means guiding said gun mount for traversing and elevational movement independently of and with respect to said gunner's support.

7. In an aircraft structure terminating in an opening, the edges of said opening determining a plane vertically disposed to the longitudinal axis of said structure, a shell closing such opening, pivot means disposed substantially parallel to the plane of the edge of the opening and guiding said shell for swinging about a horizontal axis with respect to the aircraft structure, a gun mount received in said shell to support a gun projecting therefrom, and a gunner's platform supported independently from the aircraft structure and projecting upwardly into said shell over the lower swinging edge of the shell.

8. In an aircraft structure having an opening therein, a shell closing such opening and having a slot therein, means guiding said shell for rotation with respect to the aircraft structure, a gun mount adapted to support a gun projecting through the shell slot, a carriage movable along the slot, means supporting said gun mount from said carriage and guiding it for elevational movement with respect thereto, and a spherical gun shield received in the shell slot and enclosing said gun mount.

9. The combination of claim 8, and a band received in and closing the shell slot, the spherical gun shield protruding outward from said band, and means guiding said band for movement along the slot as the gun mount supporting carriage is moved therealong, to close the slot over its entire length for all positions of the carriage and gun shield.

10. In an aircraft structure having a substantially circular opening therein disposed transversely of the direction of flight, a shell closing such opening and exposing therethrough a shell portion of substantially hemispherical shape, and such exposed shell portion having a slot therein, means guiding said shell to swing about an axis disposed diametrically of said opening, and parallel to the plane of the shell slot, a band received in and closing such slot, of a length in excess of the length of the slot, a spherical gun shield protruding centrally through said band, a gun mount enclosed by said gun shield and adapted to support a gun for traversing and elevational movement with respect to said band, and means guiding said band, gun shield and gun support for conjoint movement along the shell slot.

11. In an aircraft body having an opening therein disposed transversely of the direction of flight, a shell closing such opening and exposing therethrough a shell portion of substantially hemispherical shape in continuation of the aircraft body, and such exposed shell portion having a slot therein, means guiding said shell for rotation with respect to the aircraft body about an axis in the plane of said slot, a band closing said slot and apertured for projection of a gun therethrough, a gun mount within said shell to support a gun projecting through said band, and means guiding said band for movement lengthwise of the slot conjointly with said gun mount, for movement of a gun supported thereby.

12. In an aircraft structure having an opening therein the edges of which opening determine a vertical plane normal to the longitudinal axis of said aircraft structure, a shell closing such opening, means supporting said shell for rotation with respect to the aircraft structure, power means disposed to drive said shell for rotation, a gun mount received in said shell to support a gun projecting therefrom, means within said shell guiding said gun mount for movement with respect thereto, power means within said shell operable to effect such movement of said gun mount with respect thereto, and controls for both said power means disposed in said aircraft structure for remote control of said power means.

13. In an aircraft structure having a circular opening therein, a spherical shell received in and closing such opening, and having a great circle slot therein, means guiding said shell for rotation with respect to the aircraft structure about an axis generally parallel to and disposed diametrically of the opening, an external circular gear segment mounted on the exterior of the inner side of said sphere in a plane normal to the plane of the shell slot, a motor, a gear driven thereby and meshing with said gear segment to drive the shell for rotation, a gun mount disposed within said spherical shell and adapted to support a gun projecting through the shell slot, means supporting said gun mount from said shell for swinging about the diameter thereof disposed normal to the plane of the slot, an internal circular gear segment mounted on the interior of the inner side of said shell in a plane parallel to the plane of the slot, a second motor, a gear driven thereby meshing with said internal circular gear segment, and connected to said gun mount to swing it, for traversing movement along the shell slot of a gun carried thereby.

14. The combination of claim 13, and a gunner's support in the aircraft structure remote from the spherical shell, and control means for the motors adjacent to said gunner's support operable by the gunner to control movement of the shell and gun mount.

15. In a streamlined aircraft structure having an opening therein the edges of which opening determine a vertical plane normal to the longitudinal axis of said aircraft structure, a rotatable shell projecting from and closing such opening in continuation of the streamline contour of the aircraft structure in all positions of rotation, means supporting such shell for rotation with respect to the aircraft structure, power means connected to rotate said shell, means controllable from a point within the aircraft structure, distant from the shell, to control said power means for accomplishing such rotation, and a gun mount received in said shell to support a gun projecting therefrom.

16. In an aircraft body of truncated but otherwise streamline form, terminating in an opening defining a generally vertical plane extending transversely of the direction of flight, a gunner's support within the aircraft body, a shell closing such opening, and disposed in continuation of the aircraft body, exposing, in such continuation, a shell surface substantially hemispherical in contour, to restore the streamline form, pivot means upon the aircraft body, within such opening, and complemental pivot means on the shell interengaged therewith, and guiding the shell to swing about an axis disposed diametrically of the shell's hemispherical contour and substantially parallel to the terminus of the aircraft body, and a gun mount supported upon said shell to support a gun projecting therefrom, the gun mount and the shell being arranged and organized for movement by a gunner supported upon the support within the aircraft body.

17. In an aircraft body of truncated but otherwise streamline form, terminating in an opening defining a generally vertical plane extending transversely of the direction of flight, a gunner's support within the aircraft body, a shell closing such opening, and disposed in continuation of the aircraft body, exposing, in such continuation, a shell surface substantially hemispherical in contour, to restore the streamline form, means upon the aircraft body, within such opening, and complemental means on the shell interengaged therewith, cooperating for guiding the shell to swing about an axis disposed diametrically of the shell's hemispherical contour and substantially parallel to the terminus of the aircraft body, and a gun mount supported for movement conjointly with the shell, and adapted to support a gun projecting from the shell for aiming movement with respect to the shell by a gunner supported upon the support within the aircraft body.

18. The combination of claim 16, including means guiding the gun mount and a gun thereon for swinging with respect to the shell about an axis disposed generally at right angles to the shell's axis of swing.

19. The combination of claim 16, including means guiding the gun mount and a gun thereon for swinging with respect to the shell about an axis disposed generally at right angles to the shell's axis of swing, and power means to effect swinging movement about at least one of said axes.

20. The combination of claim 16, including means guiding the gun mount and a gun thereon for swinging with respect to the shell about an axis disposed generally at right angles to the shell's axis of swing, and two independently controllable power means, each to effect swinging movement about a different one of said axes.

21. The combination of claim 16, including power means to effect swinging movement about such axis.

22. The combination of claim 16, including means guiding the gun mount and a gun thereon for swinging with respect to the shell about an axis disposed generally at right angles to the shell's axis of swing, power means to effect swinging movement about one of said axes, and means manually operable to effect swinging movement about the other axis.

23. The combination of claim 16, including means guiding the gun mount and a gun thereon for swinging with respect to the shell about an axis disposed generally at right angles to the shell's axis of swing, power means to effect swinging movement about one of said axes, and means associated with the gun mount, and manually operable to afford local swinging action of the gun supported by the gun mount about an axis parallel to one of the first two axes, in any adjusted position of the gun mount about said first two axes.

24. The combination of claim 16, including means guiding the gun mount and a gun thereon for swinging with respect to the shell about an axis disposed generally at right angles to the shell's axis of swing, and means associated with the gun mount, and manually operable to afford corresponding local swinging action of the gun and gun mount about two axes parallel, respectively, to the first two axes, in any adjusted position of the gun mount about such first two axes.

25. In an aircraft structure having an opening, the edges whereof define a generally upright plane, a shell closing such opening and having a slot formed in its outer surface, means supporting the shell from the aircraft structure for swinging movement, relative to such structure, about an axis which is substantially parallel to the plane of the edge, track members supported from the shell, a carriage guided for movement along said track members, and a gun mount guided by said carriage for movement with the latter, and adapted to support a gun projecting through the shell's slot for traversing along such slot by movement of said carriage along the track members.

26. In an aircraft structure having an opening, the edges whereof define a generally vertical plane, a shell closing such opening and having a slot formed in its outer surface, pivot means supporting the shell from the aircraft structure for swinging movement, relative to such structure, about a single axis which is substantially parallel to the plane of the edge, track members disposed along each margin of the slot, a carriage guided for movement along said track, and a gun mount supported by said carriage for movement therewith along the shell's slot, and adapted to support a gun projecting through such slot.

27. In an aircraft structure having an opening, the edges whereof define a generally vertical plane, a shell closing such opening and having a slot formed in its outer surface, pivot means supporting the shell from the aircraft structure for swinging movement, relative to such structure, about a single axis which is substantially parallel to the plane of the edge, track members disposed along each margin of the slot, a carriage guided for movement along said track, and a gun mount supported by said carriage for movement therewith along the shell's slot, and adapted to support a gun projecting through such slot, said gun mount being mounted upon said carriage for swinging movement relative to the carriage, transversely of the slot, in any adjusted position lengthwise of the slot.

28. In an aircraft body of truncated but otherwise streamline form, terminating in an opening defining a generally vertical plane extending transversely of the direction of flight, a gunner's support within the aircraft body, a shell closing such opening, and disposed in continuation of the streamline surfaces of the aircraft body, exposing, in such continuation, a shell surface substantially hemispherical in contour, to restore the streamline form, pivot means upon the aircraft body, within such opening, and complemental pivot means on the shell interengaged therewith, and guiding the shell for swinging movement about an axis disposed diametrically of the shell's hemispherical contour and substantially parallel to the plane of the terminus of the aircraft body, a gun mount supported upon the shell to support a gun projecting therefrom, and means interposed between the gun mount and the shell for local movement of the gun mount and gun thereon relative to the shell, in the various positions of adjustment of the shell.

29. In an aircraft body of truncated but otherwise streamline form, terminating in an opening defining a generally vertical plane extending transversely of the direction of flight, a gunner's support within the aircraft body, a shell closing such opening, and disposed in continuation of the streamline surfaces of the aircraft body, exposing, in such continuation, a shell surface substantially hemispherical in contour, to restore the streamline form, pivot means upon the aircraft body, within such opening, and complemental pivot means on the shell interengaged therewith, and guiding the shell for swinging movement about an axis disposed diametrically of the shell's hemispherical contour and substantially parallel to the plane of the terminus of the aircraft body, a gun mount supported upon the shell to support a gun projecting therefrom, the shell being slotted for the projection of a gun upon the gun mount, and for the shifting of the gun mount and gun along the slot, means guiding the gun mount from the shell for such shifting movement, and means interposed between the gun mount and the shell for local movement of the gun mount and gun, relative to the shell, in the various positions of adjustment of the shell relative to the aircraft body, and of the gun mount relative to the shell.

JOHN C. SANDERS